(12) United States Patent
Syrjarinne et al.

(10) Patent No.: US 7,724,185 B2
(45) Date of Patent: May 25, 2010

(54) PROVIDING AND USING MESSAGES COMPRISING LOCATION INFORMATION

(75) Inventors: Jari Syrjarinne, Tampere (FI); Ismo Halivaara, Tampere (FI)

(73) Assignee: Nokia Corporation, Espoo (FI)

( * ) Notice: Subject to any disclaimer, the term of this patent is extended or adjusted under 35 U.S.C. 154(b) by 252 days.

(21) Appl. No.: 11/588,838

(22) Filed: Oct. 27, 2006

(65) Prior Publication Data

US 2008/0100507 A1 May 1, 2008

(51) Int. Cl.
G01S 5/14 (2006.01)
H04B 7/185 (2006.01)

(52) U.S. Cl. ................................. 342/357.09
(58) Field of Classification Search ............ 342/357.09, 342/357.1, 357.14
See application file for complete search history.

(56) References Cited

U.S. PATENT DOCUMENTS

| 6,229,478 B1 | 5/2001 | Biacs et al. |
| 2002/0145984 A1 | 10/2002 | Babu |
| 2004/0044911 A1 | 3/2004 | Takada et al. |

FOREIGN PATENT DOCUMENTS

| GB | 2380343 | 4/2003 |
| JP | 2000-165440 | 6/2000 |
| WO | WO 02/25859 | 3/2002 |

OTHER PUBLICATIONS

R.M. Kalafus, New RTCM SC-104 standard for differential GNSS, Journal of the Institute of Navigation, vol. 43(4), abstract, Winter 1996-1997.*
R.M. Kalafus, New RTCM SC-104 standard for differential GNSS, Journal of the Institute of Navigation, vol. 43(4), p. 175-181, Winter 1996-1997.*
3$^{rd}$ Generation Partnership Project; Technical Specification Group GSM/EDGE Radio Access Network; Location Services (LCS); Mobile Staton (MS)—Serving Mobile Location Centre (SMLC), Radio Resource LCS Protocol (RRLP) (Release 7); 3GPP TS 44.031 V7.2.0 (Nov. 2005).
3$^{rd}$ Generation Partnership Project; "A-GNSS support to RRLP;" 3GPP TSG-GERAN2; Tdoc G2-060273; Meeting #31bis; Turin, Italy Oct. 16-20, 2006.
3$^{rd}$ Generation Partnership Project; "Introduction of Assisted GALILEO capability as an Assisted GNSS into the GERAN;" 3GPP TSG-GERAN WG2; G2-060315 Agenda: 5.3.10; Meeting #31 bis; Turin, Italy, Oct. 16-20, 2006.

(Continued)

Primary Examiner—Thomas H Tarcza
Assistant Examiner—Fred H Mull
(74) Attorney, Agent, or Firm—Alfred A. Fressola; Ware, Fressola, Van Der Sluys & Adolphson LLP

(57) ABSTRACT

For enhancing the transmission of location information, a message is received or assembled, which includes location information and a reference time identifier. The reference time identifier identifies a reference time used in determining the location information based on satellite signals. The received or assembled message is provided for transmission to a server. At a server, the location information and the reference time identifier are extracted from a received message, and the location information is processed taking account of the reference time identifier.

33 Claims, 5 Drawing Sheets

| Element fields | Presence |
|---|---|
| Reference Frame | O (note 1) |
| GNSS Time of Day | O (note 1) |
| GNSS TOD Frac | O |
| GNSS TOD Uncertainty | O |
| GNSS_TIME_ID | O |
| Fix Type | M |
| Stationary Indication | O (note 2) |
| Location Estimate | O (note 2) |
| Velocity Estimate | O (note 2) |
| NOTE 1: Either Reference Frame or GNSS Reference Time shall always be included. | |
| NOTE 2. Stationary indication and Location and Velocity Estimates are mutually exclusive. | |

| GNSS_TIME_ID | Indication |
|---|---|
| GALILEO | 0 |
| GPS (incl. modernized GPS) | 1 |
| GLONASS | 2 |
| SBAS | 3 |
| QZSS | 4 |
| Reserved for future use | 5-7 |

OTHER PUBLICATIONS

3rd Generation Partnership Project; "Technical Specification Group Radio Access Network; Radio Resource Control (RRC); Protocol Specification (Release 7);" 3GPP TS 25.331 V7.0.0 (Mar. 2006); relevant chapters: 8.6.7.19; 10.2.48.8.18; 10.3.3.45; 10.3.7.86 through 10.3.7.112; 13.4.28a and 14.7(all).

"3rd Generation Partnership Project: Technical Specification Group GSM EDGE Radio Access Network; Location Services (LCS); Broadcast Network Assistance for Enhanced Observed Time Difference (E-OTD) and Global Positioning System (gps) Positioning Methods (Release 1999);" 3GPP TS 04.35 V8.3.0, Jan. 1, 2001; pp. 1-35.

* cited by examiner

| Element fields | Presence |
|---|---|
| Reference Frame | O (note 1) |
| GNSS Time of Day | O (note 1) |
| GNSS TOD Frac | O |
| GNSS TOD Uncertainty | O |
| GNSS_TIME_ID | O |
| Fix Type | M |
| Stationary Indication | O (note 2) |
| Location Estimate | O (note 2) |
| Velocity Estimate | O (note 2) |
| NOTE 1: Either Reference Frame or GNSS Reference Time shall always be included. | |
| NOTE 2. Stationary indication and Location and Velocity Estimates are mutually exclusive. | |

Fig. 3

| GNSS_TIME_ID | Indication |
|---|---|
| GALILEO | 0 |
| GPS (incl. modernized GPS) | 1 |
| GLONASS | 2 |
| SBAS | 3 |
| QZSS | 4 |
| Reserved for future use | 5-7 |

Fig. 4

PROVIDING AND USING MESSAGES COMPRISING LOCATION INFORMATION

FIELD OF THE INVENTION

The invention relates to providing and using messages with location information that has been determined based on satellite signals.

BACKGROUND OF THE INVENTION

A positioning of a device is supported by various Global Navigation Satellite Systems (GNSS). These include for example the American Global Positioning System (GPS), the Russian Global Navigation Satellite System (GLONASS), the future European system Galileo, the Space Based Augmentation Systems (SBAS), the Japanese GPS augmentation Quasi-Zenith Satellite System (QZSS), the Locals Area Augmentation Systems (LAAS), and hybrid systems.

The constellation in GPS, for example, consists of more than 20 satellites that orbit the earth. Currently, each of the satellites transmits two carrier signals L1 and L2. One of these carrier signals L1 is employed for carrying a navigation message and code signals of a standard positioning service (SPS). The L1 carrier phase is modulated by each satellite with a different C/A (Coarse Acquisition) code. Thus, different channels are obtained for the transmission by the different satellites. The C/A code is a pseudo random noise (PRN) code, which is spreading the spectrum over a 1 MHz bandwidth. It is repeated every 1023 bits, the epoch of the code being 1 ms. The carrier frequency of the L1 signal is further modulated with navigation information at a bit rate of 50 bit/s. The navigation information comprises inter alia ephemeris and almanac parameters. Ephemeris parameters describe short sections of the orbit of the respective satellite. Based on these ephemeris parameters, an algorithm can estimate the position of the satellite for any time while the satellite is in the respective described section. The almanac parameters are similar, but coarser orbit parameters, which are valid for a longer time than the ephemeris parameters. The navigation information further comprises for example clock models that relate the satellite time to the system time of GPS and the system time to the Coordinated Universal Time (UTC).

A GPS receiver of which the position is to be determined receives the signals transmitted by the currently available satellites, and it detects and tracks the signals used by different satellites based on the different comprised C/A codes. Then, the receiver determines the time of transmission of the code transmitted by each satellite, usually based on data in the decoded navigation messages and on counts of epochs and chips of the C/A codes. The time of transmission and the measured time of arrival of a signal at the receiver allow determining the pseudorange between the satellite and the receiver. The term pseudorange denotes the geometric distance between the satellite and the receiver, which distance is biased by unknown satellite and receiver offsets from the GPS system time.

In one possible solution scheme, the offset between the satellite and system clocks is assumed known and the problem reduces to solving a non-linear set of equations of four unknowns (3 receiver position coordinates and the offset between the receiver and GPS system clocks). Therefore, at least 4 measurements are required in order to be able to solve the set of equations. The outcome of the process is the receiver position.

Similarly, it is the general idea of GNSS positioning to receive satellite signals at a receiver which is to be positioned, to measure the pseudorange between the receiver and the respective satellite and further the current position of the receiver, making use in addition of estimated positions of the satellites. Usually, a PRN signal which has been used for modulating a carrier signal is evaluated for positioning, as described above for GPS.

A GNSS positioning can be performed in different positioning modes.

A first mode is a standalone mobile station based GNSS positioning. In this mode, the GNSS receiver receives signals from GNSS satellites. The GNSS receiver or an associated mobile device—referred to in common as mobile station—decodes navigation data directly from the satellite signals and calculates from these signals and the navigation data the position of the mobile station and other location information without any additional information from other sources.

A second mode is a network-assisted mobile station based GNSS positioning. In this mode, the GNSS receiver is associated to a mobile communication device. The GNSS receiver can be integrated into the mobile communication device or be an accessory for the mobile communication device. GNSS receiver and mobile communication device are referred to in common as mobile station. A mobile communication network provides assistance data, which is received by the mobile communication device. The assistance data can comprise for example ephemeris, position and time information. The assistance data can be used by GNSS receiver to improve its performance when acquiring and tracking satellite signals. Alternatively or in addition, the assistance data can be used at the mobile station in calculating the position of the mobile station and other location information. With provided assistance data, for example, it may not be required to decode the navigation information in tracked satellite signals.

The third mode is a network-based mobile station assisted GNSS positioning. For this mode, the GNSS receiver is associated as well to a mobile communication device. GNSS receiver and mobile communication device are referred to in common as mobile station. In this mode, a mobile communication network provides at least acquisition assistance and time information via the mobile communication device to the GNSS receiver for supporting the satellite signal measurements. The mobile station only performs signal measurements, though, and reports the measurements back to the network for position calculation.

The second and the third mode are also referred to in common as assisted-GNSS (A-GNSS). Assisted GNSS thus means that if the technical prerequisites are met, a mobile communication network is able to provide a GNSS receiver with assistance data, like time and navigation model, which allows the receiver to obtain a position fix in a shorter time and in more challenging signal conditions.

A network server, which generates assistance data and/or calculates position solutions for A-GNSS, can be for example the Serving Mobile Location Centre (SMLC) server.

In both mobile station based modes, a network server can further request location information determined by the mobile station. Such location information may be used for example for location based services requested by the mobile station or by another entity, such as a friend finding service or a Yellow Pages service. In this case, the mobile station will send the location information that it has determined in the position calculations to the network server using a dedicated location information message or location information elements (IE) in another message. Location information elements are defined in different cellular standards and typically comprise:

1. Position information in the World Geodetic System 1984 (WGS-84) coordinate frame, including latitude, longitude and altitude
2. Position uncertainty ellipse
3. Velocity information, including velocity components in a local coordinate frame: heading, heading uncertainty, horizontal speed, horizontal speed uncertainty, vertical speed, vertical speed uncertainty
4. Cellular frame time—satellite time associations
5. Reference time, that is, the time when the location information was calculated and which is to be used as the reference for the cellular frame time—satellite time associations. The reference time is preferably given either in units of seconds [s] or milliseconds [ms].

SUMMARY

The invention proceeds from the consideration that the messages for location information currently defined in cellular standards are based on GPS time only, because GPS has been the only fully and globally available GNSS so far.

Different GNSSs, however, have different system times. Consequently, the available definitions of messages for location information do not allow referring location information to any other time base than GPS, such as UTC, Galileo, GLONASS, QZSS etc. The currently defined messages are thus not applicable to any other GNSS than GPS. For example, a mobile station supporting a Galileo based positioning only cannot use the currently defined messages to report generated location information to a server, since the mobile station does not have any access to GPS time. The messages for location information thus have to be redefined to be compatible with upcoming systems.

It would be possible to define separate messages for location information for each GNSS, but this would increase the number of definitions significantly. Alternatively, it would be possible to require that UTC is used for all systems, but this would render the use of GNSS less flexible.

A first method is described, which comprises receiving or assembling a message including location information and a reference time identifier. The location information is assumed to be determined based on satellite signals and the reference time identifier identifies a reference time used in determining the location information. The method further comprises providing the message for transmission.

Moreover, a first apparatus is described, which comprises a processing component configured to receive or assemble a message including location information and a reference time identifier. The location information is assumed again to be determined based on satellite signals and the reference time identifier identifies a reference time used in determining the location information. The processing component is further configured to provide a received or assembled message for transmission.

The processing component of the described first apparatus can be implemented in hardware and/or software. It may be for instance a processor executing software program code for realizing the required functions. Alternatively, it could be for instance a circuit that is designed to realize the required functions, for instance implemented in a chipset or a chip, like an integrated circuit. The described apparatus can be for example identical to the comprised processing component, but it may also comprise additional components. The apparatus could further be for example a module provided for integration into an electronic device, like a wireless communication device or a GNSS accessory device.

Moreover, an electronic device is described, which comprises the first described apparatus. In addition, the device comprises a GNSS receiver configured to receive the satellite signals and/or a wireless communication component configured to enable a communication with a server to which the message is to be transmitted.

The wireless communication component can be for instance a cellular engine or a Wireless Local Access Network (WLAN) engine, etc. The described electronic device can be for example an enhanced mobile phone, laptop or GNSS accessory device, etc.

Moreover, an assembly is described, which comprises an electronic device with a GNSS receiver configured to receive satellite signals and a wireless communication device configured to enable a communication with a server to which a message is to be transmitted. One of these devices could then include the described first apparatus. The devices of the assembly can be liked to each other with any suitable data link, for example a fixed cable, a Bluetooth™ link, an Ultra Wideband (UWB) link or an Infrared link, etc.

The wireless communication device of the described assembly can be for instance a cellular terminal or a WLAN terminal, etc. A cellular terminal can be a cellular phone or any other type of cellular terminal, like a laptop, which comprises means for establishing a link to a server via a wireless network.

Moreover, an electronic device is described, which comprises the first described apparatus, an interface enabling a connection to a wireless communication device and in addition an interface enabling a connection to a server to which the message is to be transmitted. This electronic device can be for example a network server which assembles the described message based on measurement results received from the wireless communication device or a network server or gateway which receives an already assembled message from the wireless communication device. The server to which the message is transmitted may be for instance a server providing some location based service.

Moreover, a first computer program product is described, in which a program code is stored in a computer readable medium. When executed by a processor, the program code realizes the first described method.

The first described computer program product could be for example a separate memory device, or a memory that is to be integrated in an electronic device. The invention is to be understood to cover the computer program code also independently from a computer program product and a computer readable medium.

In addition, a second method is described, which comprises extracting location information and a reference time identifier from a received message. The location information was determined based on satellite signals and the reference time identifier identifies a reference time used in determining the location information. The method further comprises processing the location information taking account of the reference time identifier.

Moreover, a second apparatus is described, which comprises a processing component configured to extract location information and a reference time identifier from a received message. The location information was determined based on satellite signals and the reference time identifier identifies a reference time used in determining the location information. The processing component is further configured to process the location information taking account of the reference time identifier.

The processing component of the described second apparatus can equally be implemented in hardware and/or software. It may be for instance a processor executing software program code for realizing the required functions. Alternatively, it could be for instance a circuit that is designed to realize the required functions, for instance implemented in a chipset or a chip, like an integrated circuit. The described apparatus can be for example identical to the comprised processing component, but it may also comprise additional components. The apparatus could further be for example a module provided for integration into a network server, like an SMLC server.

Moreover, an electronic device is described, which comprises the described second apparatus and an interface configured to enable a direct or indirect communication with a wireless communication device. The electronic device can be for instance a network server providing a location based service.

Moreover, a server is described, which comprises the described second apparatus and an interface configured to enable a communication with another electronic device. The described server can be for instance a network server providing a location based service, while the other electronic device can be for instance a network server assembling or forwarding messages of the defined type or a gateway forwarding messages of the defined type, etc.

Moreover, a second computer program product is described, in which a program code is stored in a computer readable medium. When executed by a processor, the program code realizes the second described method.

The second computer program product could again be for example a separate memory device, or a memory that is to be integrated in an electronic device. The invention is to be understood to cover the computer program code also independently from a computer program product and a computer readable medium.

Moreover, a system is described, which comprises the described first apparatus and the described second apparatus.

It is thus proposed that a reference time identity is included in a message conveying location information, to identify one of various possible types of time that has been used as the reference time for the location information, while all previously presented solutions support only a single type of reference time.

The described approach allows using a single message definition with any GNSS.

A new message may be defined to this end that can be used to transmit location information from a mobile station or a mobile assembly to a server using any GNSS specific system time or UTC as the reference time. This enables the mobile station or the mobile assembly to use any type of reference time for generating the location information and the server to unambiguously identify which type of reference time is used. This is beneficial, since the server may not know in advance which GNSS is supported by a mobile station or mobile assembly and/or which satellites of which satellite systems are available at the position of the mobile station or the mobile assembly for time decoding.

Alternatively, a single message may be defined which allows transmitting location information from a server to another server using any GNSS specific system time or UTC as the reference time. The connection between the servers can be a dedicated network connection or the Internet. An example of the server system is that the first server has only a positioning function either to receive location information from the mobile stations or to calculate the location information from the measurements received from the mobile stations. The second server does not necessarily have any position calculation functionality, but it has only the functionality to use the location information for certain location based services such as Friend Finding or Yellow Page searches.

The reference time identifier can be included in a mandatory field or in an optional field of a message. If it is included in an optional field, a default reference time could be defined, for example a coordinated universal time. A reference time identifier may then be included in the message only, in case the used reference time is different from the default reference time.

The location information that may be included in a message can be for instance an indication of a position. In addition, the message may include for example an indication of a velocity, of a time and/or of time associations. A time associations may be for instance Cellular Frame Time—Satellite Time associations.

The invention can be used with any kind of GNSS positioning, like GPS, GLONASS, GALILEO, SBAS, QZSS, LAAS or a combination of these. Consequently, a dedicated identifier for a reference time may be defined for example for the Galileo positioning system, for GPS (including modernized GPS), for GLONASS, for SBAS, for QZSS, for LAAS and/or for UTC, but equally for any other system time, including any future system time.

The invention can further be used for instance for enhancing 3GPP GERAN ($3^{rd}$ Generation Partnership Program GSM (Global System for Mobile Communications)/EDGE (Enhanced Data Rates for GSM Evolution) Radio Access Network), 3GPP RAN (Radio Access Network) and OMA SUPL (Open Mobile Alliance Secure User Plane Location) protocols.

It is to be understood that all presented exemplary embodiments may also be used in any suitable combination.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 3 is a table illustrating the insertion of an optional field for a reference time identifier;

FIG. 4 is a table illustrating a possible coding of the reference time identifier;

DETAILED DESCRIPTION OF THE INVENTION

Figure 1:
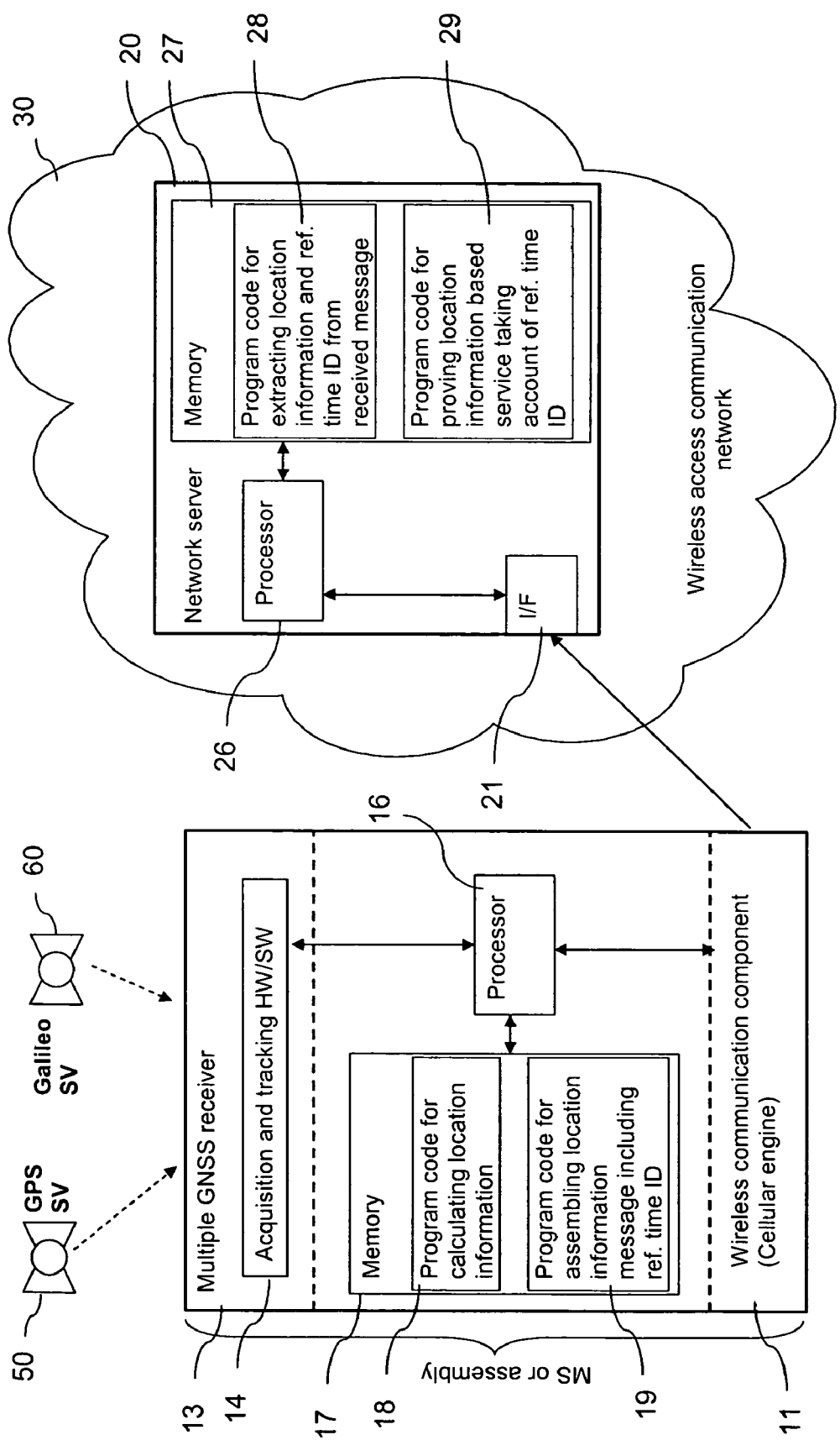
FIG. 1 is a schematic block diagram of a system according to an embodiment of the invention.

FIG. 1 is a schematic block diagram of an exemplary system, which facilitates the transmission of location information to a server.

The system comprises a mobile station 10 and a network server 20 of a GSM network 30 or of any other communication network that enables a wireless access. The system further comprises GNSS satellites, for example GPS satellites (GPS SV) 50 and Galileo satellites (Galileo SV) 60. Alternative or additional satellites could be for instance GLONASS, SBAS, QZSS or LAAS satellites.

The mobile station 10 comprises a wireless communication component 11, a GNSS receiver 13, a processor 16 and a memory 17. The processor 16 is linked to each of the other components 11, 13, 17.

The mobile communication component 11 could be for instance a cellular engine. A cellular engine is a module which comprises all components required for a conventional mobile communication between a mobile terminal and a cellular communication network 30 and which may further be enhanced with additional functions. In one embodiment, the functions of processor 16 and memory 17 could also be implemented in a processor and a memory of such a cellular engine.

The GNSS receiver 13 may be configured to be able to receive signals from a single type of GNSS satellites or from different types of GNSSs satellites 50, 60. The GNSS receiver 13 includes an acquisition and tracking component 14, which may be realized in hardware and/or in software. For instance, for acquiring and tracking signals received from GPS satellites 50 or Galileo satellites 60, signal measurement tasks, including correlation tasks, could be performed by hardware under control of a software code which is executed by a processing unit of the GNSS receiver 13. In one embodiment, the functions of processor 16 and memory 17 could also be implemented in a processor and a memory of such a GNSS receiver 13. In another embodiment, the wireless communication component 11 could be enhanced to take care of any software based processing that is required by the GNSS receiver 13.

The processor 16 is configured to execute implemented computer program code for realizing various functions. The memory 17 is configured to store computer program code, which may be retrieved by the processor 16 for execution. The stored code includes computer program code 18 for calculating location information using a GNSS based positioning and computer program code 19 for assembling location information messages including a reference time identity (ID).

It is to be understood that the functions of the processor 16 executing computer program code 18 and 19 could equally be implemented by circuitry, for example in an integrated circuit.

Instead of a single-device mobile station 10, also a mobile assembly 10 could be used, which is indicated in FIG. 1 by dashed lines. Such a mobile assembly 10 could include a mobile terminal with mobile communication component 11 and a GNSS accessory device with GNSS receiver 13. The processor 16 and the memory 17 could belong either to the mobile terminal or to the GNSS accessory device.

The network server 20 comprises a processor 26 and, linked to this processor 26, an interface 21 and a memory 27.

The interface 21 is configured to enable a communication with mobile stations 10 accessing the network 30. The communication is enabled more specifically via some other elements of the network 30 not shown, including for example base transceiver stations (BTS).

The processor 26 is configured to execute implemented computer program code for realizing various functions. The memory 27 is configured to store computer program code, which may be retrieved by the processor 26 for execution. The stored code includes computer program code 28 for extracting location information and reference time ID from a received location information message. Further, it includes computer program code 29 for providing at least one location based service. Such a service may be for instance a friend-finding service or a yellow pages service providing business locations of a desired type close to the current location of a requesting mobile station 10.

It is to be understood that the functions of the processor 26 executing computer program code 28 and 29 could equally be implemented by circuitry, for example in an integrated circuit.

An operation in the system of FIG. 1 will now be described with reference to FIGS. 2 to 4.

Figure 2:
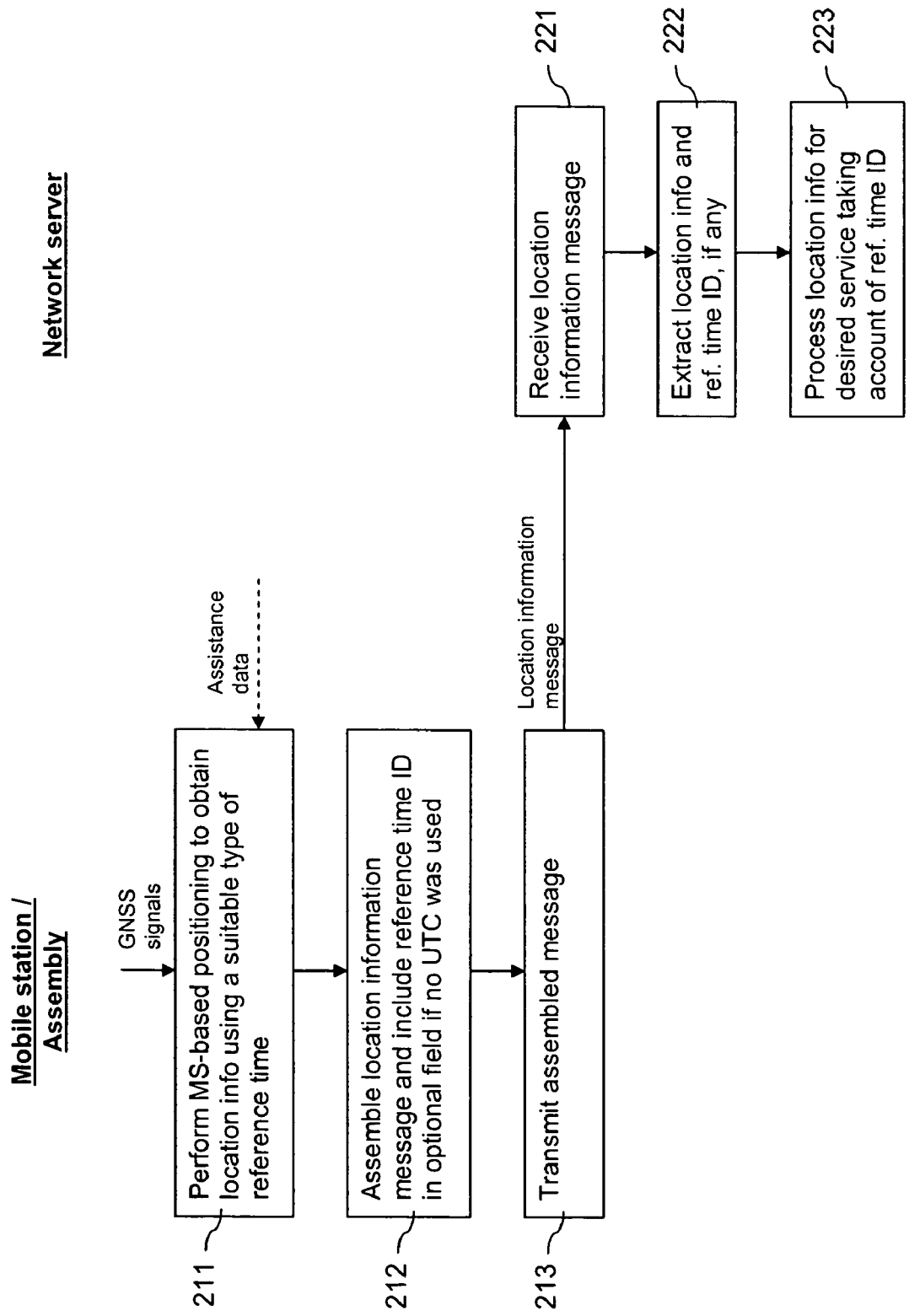
FIG. 2 is a flow chart illustrating an operation in the system of FIG. 1.

FIG. 2 is a flow chart illustrating on the left hand side an operation at the mobile station 10 and on the right hand side an operation at the network server 20.

At the mobile station 10, the acquisition and tracking component 14 of the GNSS receiver 13 acquires and tracks satellite signals and provides the measurement results to the processor 16. The processor 16 executes computer program code 18 to perform a mobile based positioning based on the signal measurements (step 211). Optionally, the acquisition and tracking of the GNSS receiver 13 and/or the positioning calculations of the processor 16 may be supported by assistance data, which is provided by the network 30 and received via the wireless communication component 11.

For the positioning calculations, the processor 16 uses a suitable type of reference time. It could use for instance the GPS time in case the positioning is based on GPS satellite signals, the Galileo system time in case the positioning is based on Galileo satellite signals, or the UTC in case the positioning is based on both GPS and Galileo satellite signals, etc. In case the GNSS receiver 13 is configured to be able to receive signals from a single type of GNSS satellites, it will always use the same type of reference time.

The reference time is used at the mobile station 10 in satellite position calculation and as time reference in GNSS System Time—GSM Time associations and/or other associations such as GNSS—UMTS or GNSS—WLAN Frame Timing associations, etc.

The processor 16 further executes computer program code 19 to assemble the resulting location information in a location information message or in a location information element of a more comprehensive message (step 212). In addition to the actual location information, a reference time ID is included, which indicates the type of the reference time that was used in the positioning calculations. In case the GNSS receiver 13 is configured to be able to receive signals from a single type of GNSS satellites, it will always use the same reference time ID.

FIG. 3 is a table presenting exemplary defined element fields that may be selected for assembling the message or the information element. Optional fields are marked by an "O" in a "Presence" column, while mandatory fields are marked by an "M" in the "Presence" column.

A first defined field is a Reference Frame field. This field specifies the BTS Reference Frame number during which the location estimate was measured at the mobile station 10.

A second defined field is a GNSS Time of Day (TOD) field. This field specifies the GNSS time for which the location estimate is valid. It may be rounded down to the nearest integer millisecond. In the case of GPS, for example, the TOD could be given by the GPS time-of-week (TOW).

While the first field and the second field are optional, either the reference frame or the GNSS TOD should always be included in the presented exemplary embodiment.

An optional third defined field is a GNSS TOD fraction (Frac) field. This field specifies the GNSS time more precisely by indicating a fraction of the GNSS TOD in sub-milliseconds.

An optional fourth defined field is a GNSS TOD uncertainty field. This field provides the accuracy of the relation between the GNSS time and the cellular system time. The true GNSS time, corresponding to the provided cellular system time as observed at the location of the mobile station 10, may lie for example in the interval (GNSS TOD−GNSS TOD Uncertainty, GNSS TOD+GNSS TOD Uncertainty).

An optional fifth defined field is a reference time identity (GNSS_TIME_ID) field. The GNSS_TIME_ID field defines which satellite system time has been used as the reference for the time information indicated for example by the GNSS TOD and the GNSS TOD Fraction.

FIG. 4 is a table which presents an exemplary coding of the GNSS_TIME_ID. The table associates an ID value in the column "Indication" to various types of reference time in the column "GNSS_TIME_ID".

In this table, each reference time ID is represented by another integer value between zero and seven so that each integer value may be coded by three bits. The Galileo system time could be represented by a zero, the GPS time, including the time of a modernized GPS, could by represented by a one, the GLONASS time could by represented by a two, the SBAS time could by represented by a three, and the QZSS time could by represented by a four. The integer values five to seven could be reserved for future use.

In the presented example, the GNNS_TIME_ID is included in a location information message or location information element, if another time than UTC is used as the reference time. It is to be understood that alternatively, a code for the UTC time could be provided as well.

Returning to the table of FIG. 3, a mandatory sixth defined field is a Fix Type field. This field indicates whether the mobile station 10 performed two-dimensional (2D) or three-dimensional (3D) measurements.

An optional seventh defined field is a Stationary Indication field. This field indicates whether the measuring entity has moved less than a distance of 5 cm during an ADR accumulation time or whether the measuring entity is in a fixed position. If the measuring entity is not capable of determining its state of motion or measuring the movement, this field is set to '0' by default. If the measuring entity is not moving, the measuring entity can indicate the static motion by setting the stationary indication to '1' and not to send the Velocity Estimate field in the location information element as the velocity of the measuring entity will be zero. If the measuring entity is requested to report periodic location information elements, the measuring entity can set the stationary indication to '1' and not to send the Position Estimate and Velocity Estimate fields if the measuring entity has not moved since the previous report.

An optional eight defined field is a Location Estimate field. This field contains a location estimate for the mobile station 10 resulting in the positioning calculations.

An optional nine defined field is a Velocity Estimate field. This field contains a velocity estimate resulting in the positioning calculations.

Each location information message should contain at the most one of the fields seven to nine in the presented exemplary embodiment.

Various types of location information fields have been specified in the technical specification 3GPP TS 25.331 V7.0.0 (2006-03): "Radio Resource Control (RRC); Protocol Specification (Release 7)" and in the technical specification 3GPP TS 44.031 V7.2.0 (2005-11): "Location Services (LCS); Mobile Station (MS)—Serving Mobile Location Centre (SMLC) Radio Resource LCS Protocol (RRLP) (Release 7)", to which it is referred for details. Moreover, location information fields have been presented by the 3GPP GERAN Work Group 2 for the A-GNSS Location Information in document Tdoc G2-060315: "Introduction of Assisted GALILEO capability as an Assisted GNSS into the GERAN" 3GPP TSG-GERAN WG2 Meeting #31bis, Turin, Italy, 16-20 Oct., 2006, and in document Tdoc G2-060273: "A-GNSS support to RRLP", 3GPP TSG-GERAN2 Meeting #31bis, Turin, Italy, 16-20 Oct. 2006, to which it is further referred for details.

The processor 16 provides the assembled location information message or another message comprising the assembled location information element to the wireless communication component 11 for transmission. The assembled location information can be provided in particular together with a request for some location based service offered by the network server 20.

The mobile communication component 11 transmits the received message via other elements of the network 30 to the network server 20 (step 213).

In the network server 20, the interface 21 receives the message (step 221) and provides it to the processor 26.

The processor 26 executes computer program code 28 to extract the location information and the reference time ID, if any, from the received message (step 222).

The processor 26 further executes computer program code 29 for providing a desired service based on the extracted location information (step 223). In order to be able to use the location information correctly, the processor 26 takes account of the type of the reference time as defined by the extracted reference time ID that was used in generating the location information. That is, the reference time ID indicates to the processor 26, which type of reference time has been used for determining the GNSS TOD and/or the TNSS TOD Fraction.

The reference time may be used for instance to evaluate the "age" of the location information and to relate the GNSS System Time—GSM Time associations, or other associations, from multiple mobile stations correctly. For example, if a first mobile station reports the associations with respect to Galileo time and a second mobile station reports the associations with respect to GLONASS time, both mobile stations being involved in a desired service, the server 20 can now compensate the time difference between Galileo and GLONASS times from the time associations.

The reference time identifier of the presented exemplary embodiment thus allows using the same location information message with any GNSS time or even with UTC. As a result, there is no need to specify a plurality of GNSS specific location information messages, which may reduce the complexity of the implementation of network servers and the complexity in the communication system standards.

The presented exemplary embodiment is also forward compatible, since a few values of the reference time identifier GNSS_TIME_ID are reserved for the future systems.

The functions illustrated by the processor 16 executing program code 19 or a corresponding circuitry can also be viewed as means for receiving or assembling a message including location information and a reference time identifier, the location information being determined based on satellite signals and the reference time identifier identifying a reference time used in determining the location information; and as means for providing the message for transmission to a network server.

The program code 19 can also be viewed as comprising such means in the form of functional modules.

The functions illustrated by the processor 26 executing program code 28 or a corresponding circuitry can also be viewed as means for extracting from a received message location information and a reference time identifier, the location information being determined based on satellite signals and the reference time identifier identifying a reference time used in determining the location information; while the processor 26 executing program code 29 or a corresponding circuitry can also be viewed as means for processing the location information taking account of the reference time identifier.

The program codes 28 and 29 can also be viewed as comprising such means in the form of functional modules.

Figure 5:
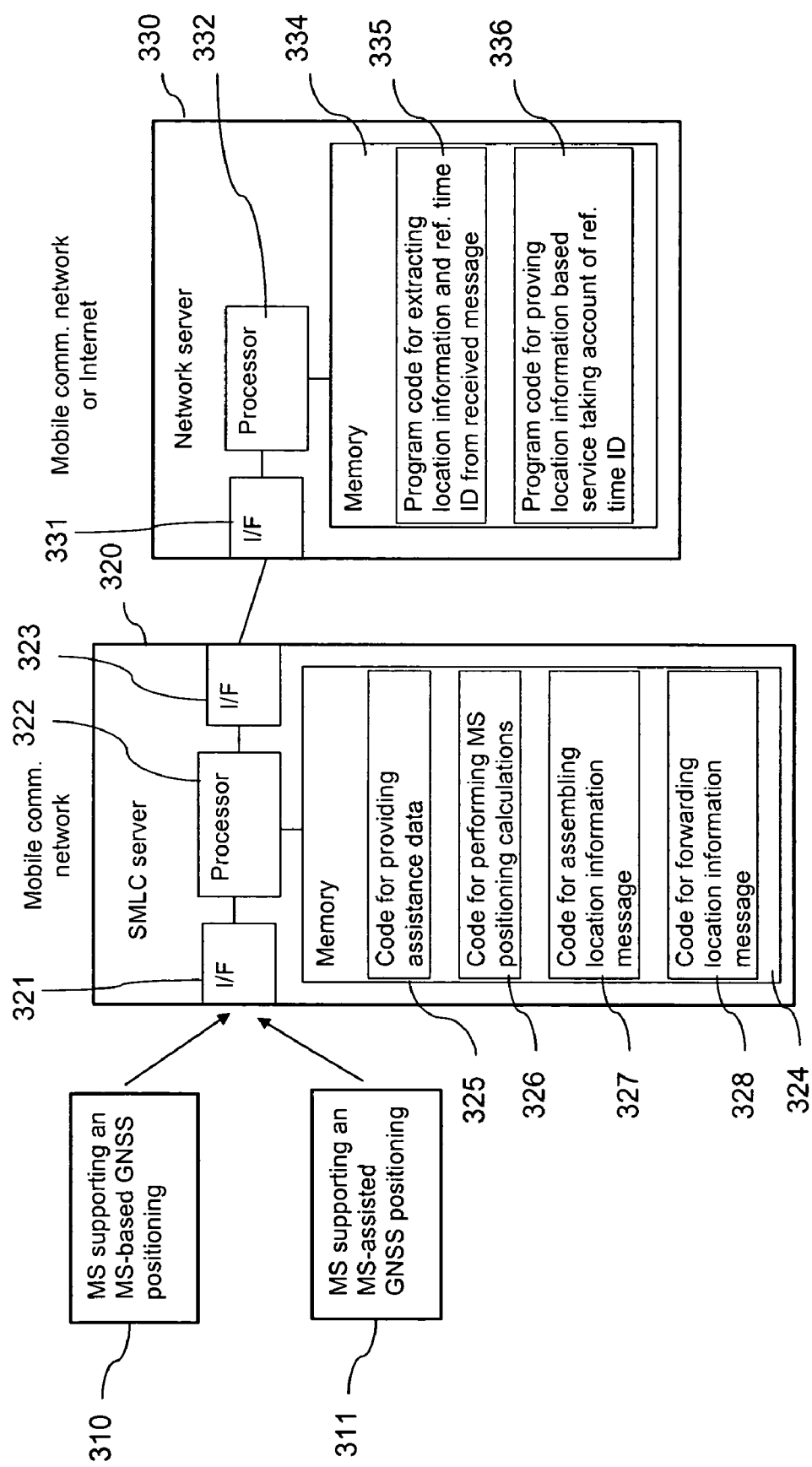
FIG. 5 is a schematic block diagram of a system according to a further embodiment of the invention.

FIG. 5 is a schematic block diagram of another exemplary system, which facilitates the transmission of location information to a server.

The system comprises a first mobile station 310 including a GNSS receiver and supporting a mobile station based GNSS positioning. It may correspond to the mobile station 10 described above with reference to FIG. 1. The system further comprises a second mobile station 311 including a GNSS receiver and supporting a mobile station assisted GNSS positioning.

The system further comprises a first server 320 and a second server 330.

The first server 320 can be for example an SMLC server. It may belong for example to a mobile communication network which the mobile stations 310, 311 are able to access or to some other network that is linked to this mobile communication network. The server 320 may be basically only a server to assist mobile stations 310, 311 to calculate the fix, to gather location information from mobile stations, to calculate the location information from satellite signal measurements that mobile stations produce or to calculate/determine location information from cellular network measurements and/or information such as Cell-ID, Rx-levels, Timing Advance etc.

Server 320 comprises a processor 322 and, linked to this processor 322 a first interface 321 enabling a communication with mobile stations 310, 311, a second interface enabling a communication with network server 330 and a memory 324. The processor 322 is configured to execute computer program code stored in the memory 324. The stored code includes code 325 for providing assistance data to mobile stations, code 326 for performing positioning calculations based on satellite signal measurement results provided by mobile stations, code 327 for assembling location information messages, and code 328 for forwarding location information messages received from a mobile station.

Network server 330 may be configured to provide location based services. It may belong for instance as well to the mobile communication network which the mobile stations 310, 311 are able to access or to some other network that is linked to this mobile communication network, like the Internet.

Network server 330 comprises a processor 332 and, linked to this processor 332 an interface 331 enabling a communication with network server 320 and a memory 334. The processor 332 is configured to execute computer program code stored in the memory 334. The stored code includes code 335 for extracting location information and a reference time identifier from a received message and code 336 for providing a location based service such as Yellow Pages.

Figure 6:
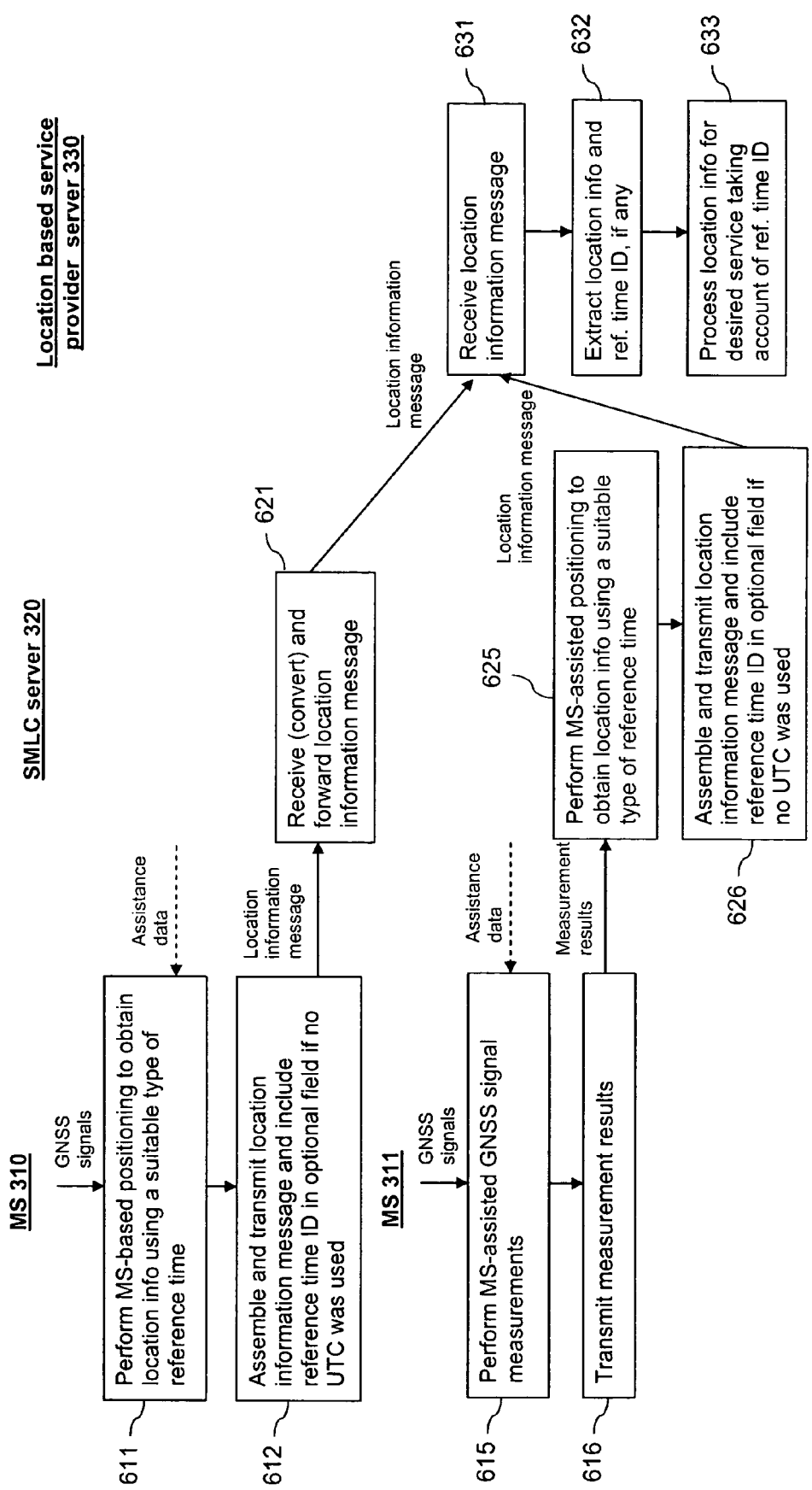
FIG. 6 is a flow chart illustrating an operation in the system of FIG. 5.

An operation in the system of FIG. 5 is illustrated in FIG. 6.

FIG. 6 is a flow chart that presents on the left hand side an operation in mobile stations 310, 311, in the middle an operation in network server 320 and on the right hand side an operation in network server 330.

Mobile station 310 may operate just like mobile station 10 of FIG. 1. Steps 611 and 612 may thus correspond to steps 211, 212 and 213 described above with reference to FIG. 2. Mobile station 310 transmits an assembled message comprising location information and a reference time identifier to server 320.

In server 320, the processor 322 executing program code 328 receives the message via interface 321 and forwards the message via interface 323 to server 330 (step 621). It is to be understood that the processor 322 may convert the message from a format required by interface 321 to a format required by interface 323. That is, a different message may be defined for the connection between mobile station 310 and server 320 and for the connection between server 320 and server 330.

In addition or alternatively, mobile station 311 performs satellite signal measurements for a mobile station assisted GNSS positioning (step 615). Required assistance data may be provided by processor 322 executing program code 325. The processor 322 may receive the required information for example from a connected local measurement unit (not shown).

Mobile station 311 does not perform any positioning calculations by itself, but transmits the measurement results to server 320 (step 616).

In server 320, the processor 322 executing program code 326 receives the measurement results via interface 321 and performs positioning calculations for mobile station 311 (step 625) based on the measurement results and possibly on other information received for example from a connected local measurement unit (not shown).

For the positioning calculations, the processor 322 uses a suitable type of reference time. The reference time may correspond for instance to the system time of the GNSS used by mobile station 311 for the measurements.

The processor 322 further executes program code 327 to assemble the resulting location information in a location information message or in a location information element of a more comprehensive message. In addition to the actual location information, a reference time ID is included, which indicates the type of the reference time that was used in the positioning calculations. A location information element or location information message may comprise again for example the fields presented in FIG. 3. The resulting message is transmitted via interface 323 to server 330 (step 626).

Server 330 receives any message including location information and a reference time ID and processes them for providing a desired service. Steps 631, 632 and 633, which are carried out at network server 330 to this end, correspond to steps 221, 222 and 223 described above with reference to FIG. 2. The processing may be the same for messages assembled by a mobile station 310 and for messages assembled by server 320.

It is to be understood that the presented assembling and forwarding functions could equally be realized by different or additional servers or by gateways.

Thus, the functions illustrated by the processor 322 executing program code 328 or 327, respectively, or a corresponding circuitry, can also be viewed as means for receiving or assembling a message including location information and a reference time identifier, the location information being determined based on satellite signals and the reference time identifier identifying a reference time used in determining the location information; and as means for providing the message for transmission to a network server.

The program codes 328 and 327 can also be viewed as comprising such means in the form of functional modules.

The functions illustrated by the processor 332 executing program code 335 or a corresponding circuitry can also be viewed as means for extracting from a received message location information and a reference time identifier, the location information being determined based on satellite signals and the reference time identifier identifying a reference time used in determining the location information; while the processor 332 executing program code 336 or a corresponding circuitry can also be viewed as means for processing the location information taking account of the reference time identifier.

The program codes 335 and 336 can also be viewed as comprising such means in the form of functional modules.

It is to be understood that all described links in the above presented exemplary embodiments can be direct or indirect links.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
   electronically receiving or electronically assembling a message, said message including in a first field location information, in a second field an indication of a time for which the location information is valid and in a third field a reference time identifier, said location information being determined based on satellite signals and said reference time identifier identifying a type of reference time that has been used for the time indicated in said second field; and
   electronically providing said message for transmission.

2. The method according to claim 1, wherein said reference time identifier is included in an optional field in said message.

3. The method according to claim 1, wherein said reference time identifier is included only, in case said used reference time is different from a coordinated universal time.

4. The method according to claim 1, wherein said message includes in addition at least one of:
   an indication of a velocity; and
   an indication of time associations.

5. The method according to claim 1, wherein a dedicated reference time identifier is defined for at least one of:
   a Galileo positioning system;
   a global positioning system;
   a global orbiting navigation satellite system;
   a space based augmentation system;
   a quasi-zenith satellite system; and
   a coordinated universal time.

6. The method according to claim 1, wherein said reference time identifier is one of a plurality of defined reference time identifiers.

7. The method according to claim 1, wherein said location information is an indication of a position.

8. A computer program product in which a program code is stored in a computer readable medium, said program code configured to when executed by a processor, to cause an apparatus to at least perform:
   electronically receiving or electronically assembling a message, said message including in a first field location information, in a second field an indication of a time for which the location information is valid and in a third field a reference time identifier, said location information being determined based on satellite signals and said reference time identifier identifying a type of reference time that has been used for the time indicated in said second field; and
   electronically providing said message for transmission.

9. An apparatus comprising:
   at least one processor and at least one memory including program code, the at least one memory and the program code configured to, with the at least one processor, cause the apparatus at least to perform receiving or assembling a message, said message including in a first field location information, in a second field an indication of a time for which the location information is valid and in a third field a reference time identifier, said location information being determined based on satellite signals and said reference time identifier identifying a reference time that has been used for the time indicated in said second field; and providing a received or assembled message for transmission.

10. The apparatus according to claim 9, wherein said at least one memory and program code are configured to, with the at least one processor, cause the apparatus at least to perform including said reference time identifier in an optional field in said message.

11. The apparatus according to claim 9, wherein said at least one memory and program code are configured to, with the at least one processor, cause the apparatus at least to perform including said reference time identifier only, in case said used reference time is different from a coordinated universal time.

12. The apparatus according to claim 9, wherein said at least one memory and program code are configured to, with the at least one processor, cause the apparatus at least to perform including in said message in addition at least one of:
   an indication of a velocity; and
   an indication of time associations.

13. The apparatus according to claim 9, wherein said at least one memory and program code are configured to, with the at least one processor, cause the apparatus at least to perform selecting said reference time identifier from a dedicated reference time identifier defined for at least one of:
   a Galileo positioning system;
   a global positioning system;
   a global orbiting navigation satellite system;
   a space based augmentation system;
   a quasi-zenith satellite system; and
   a coordinated universal time.

14. An electronic device comprising:
   an apparatus according to claim 9; and
   a global navigation satellite system receiver configured to receive said satellite signals.

15. The electronic device according to claim 14, further comprising a wireless communication component configured to enable a communication with a server to which said message is to be transmitted.

16. The apparatus according to claim 9, wherein said reference time identifier is one of a plurality of defined reference time identifiers.

17. The apparatus according to claim 9, wherein said processor is configured to include in said message as location information an indication of a position.

18. An electronic device comprising:
an apparatus according to claim 9; and
a wireless communication component configured to enable a communication with a server to which said message is to be transmitted.

19. An assembly comprising
an electronic device with a global navigation satellite system receiver configured to receive satellite signals; and
a wireless communication device configured to enable a communication with a server to which said message is transmitted;
one of said devices including an apparatus according to claim 9.

20. An electronic device comprising:
an apparatus according to claim 9;
an interface enabling a connection to a wireless communication device; and
an interface enabling a connection to a server to which said message is to be transmitted.

21. A system comprising:
an apparatus according to claim 9; and
an apparatus comprising:
at least one processor and at least one memory including program code, the at least one memory and the program code configured to, with the at least one processor, cause the apparatus at least to perform extracting from a received message location information in a first field of said message, an indication of a time for which the location information is valid in a second field of said message and a reference time identifier in a third field of said message, said location information being determined based on satellite signals and said reference time identifier identifying a reference time that has been used for the time indicated in said second field; and processing said location information taking account of said reference time identifier.

22. An apparatus comprising:
means for electronically receiving or electronically assembling a message, said message including in a first field location information, in a second field an indication of a time for which the location information is valid and in a third field a reference time identifier, said location information being determined based on satellite signals and said reference time identifier identifying a type of reference time that has been used for the time indicated in said second field; and
means for electronically providing said message for transmission.

23. A method comprising:
electronically extracting from a received message location information in a first field of said message, an indication of a time for which the location information is valid in a second field of said message and a type of reference time identifier in a third field of said message, said location information being determined based on satellite signals and said reference time identifier identifying a reference time that has been used for the time indicated in said second field; and
electronically processing said location information taking account of said reference time identifier.

24. The method according to claim 23, wherein said reference time identifier is one of a plurality of defined reference time identifiers.

25. The method according to claim 23, wherein said location information is an indication of a position.

26. A computer program product in which a program code is stored in a computer readable medium, said program code configured to, when executed by a processor, cause an apparatus to at least perform:
electronically extracting from a received message location information in a first field of said message, an indication of a time for which the location information is valid in a second field of said message and a reference time identifier in a third field of said message, said location information being determined based on satellite signals and said reference time identifier identifying a type of reference time that has been used for the time indicated in said second field; and
electronically processing said location information taking account of said reference time identifier.

27. An apparatus comprising:
at least one processor and at least one memory including program code, the at least one memory and the program code configured to, with the at least one processor, cause the apparatus at least to perform extracting from a received message location information in a first field of said message, an indication of a time for which the location information is valid in a second field of said message and a reference time identifier in a third field of said message, said location information being determined based on satellite signals and said reference time identifier identifying a type of reference time that has been used for the time indicated in said second field; and
processing said location information taking account of said reference time identifier.

28. The apparatus according to claim 27, wherein said reference time identifier is one of a plurality of defined reference time identifiers.

29. The apparatus according to claim 27, wherein said at least one memory and program code are configured to, with the at least one processor, cause the apparatus at least to perform extracting from said received message as location information an indication of a position.

30. An electronic device comprising:
an apparatus according to claim 27; and
an interface configured to enable a communication with a wireless communication device.

31. The electronic device according to claim 30, wherein said electronic device is a network server.

32. A server comprising:
an apparatus according to claim 27; and
an interface configured to enable a communication with another electronic device.

33. An apparatus comprising:
means for electronically extracting from a received message location information in a first field of said message, an indication of a time for which the location information is valid in a second field of said message and a type of reference time identifier in a third field of said message, said location information being determined based on satellite signals and said reference time identifier identifying a reference time that has been used for the time indicated in said second field; and
means for electronically processing said location information taking account of said reference time identifier.

* * * * *